United States Patent
Narita

(10) Patent No.: US 10,589,702 B2
(45) Date of Patent: Mar. 17, 2020

(54) COLLISION DETECTION DEVICE FOR VEHICLE AND COLLISION DETECTION METHOD FOR VEHICLE

(71) Applicant: TOYOTA JIDOSHA KABUSHIKI KAISHA, Toyota-shi, Aichi-ken (JP)

(72) Inventor: Sotaro Narita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 15/641,925

(22) Filed: Jul. 5, 2017

(65) Prior Publication Data
US 2018/0037180 A1  Feb. 8, 2018

(30) Foreign Application Priority Data

Aug. 5, 2016  (JP) .................. 2016-154869

(51) Int. Cl.
*B60R 21/0132* (2006.01)
*B60R 21/34* (2011.01)
*B60R 21/00* (2006.01)
*B60R 21/01* (2006.01)

(52) U.S. Cl.
CPC ...... *B60R 21/0133* (2014.12); *B60R 21/0132* (2013.01); *B60R 21/34* (2013.01); *B60R 2021/003* (2013.01); *B60R 2021/0088* (2013.01); *B60R 2021/01013* (2013.01); *B60R 2021/01204* (2013.01); *B60R 2021/01286* (2013.01)

(58) Field of Classification Search
USPC ......................................... 701/46
See application file for complete search history.

(56) References Cited

U.S. PATENT DOCUMENTS

| 6,405,113 B1* | 6/2002 | Yamawaki | B62D 6/04 180/446 |
| 6,529,126 B1* | 3/2003 | Henry | A42B 3/0453 340/425.5 |
| 2004/0186643 A1* | 9/2004 | Tanaka | B60R 19/483 701/45 |
| 2006/0213714 A1 | 9/2006 | Igawa | |

(Continued)

FOREIGN PATENT DOCUMENTS

| DE | 10333735 A1 | 3/2005 |
| DE | 102012022392 A1 | 5/2014 |

(Continued)

OTHER PUBLICATIONS

Google patents English translation for Japanese Patent Pub. No. JP 4007012,B to Ozaki et al. (JP,2003-226211,A)that was filed in Dec. 8, 2003 and is assigned to Nissan™.*

(Continued)

*Primary Examiner* — Jean Paul Cass
(74) *Attorney, Agent, or Firm* — Oliff PLC

(57) ABSTRACT

An object is identified by an on-board camera and a relative speed of the vehicle and the object is acquired. If the object is a two-wheel vehicle and the relative speed is lower than the vehicle speed, the relative speed is set as a collision speed. If the object is an object other than a two-wheel vehicle, the vehicle speed is set as the collision speed. Using the set collision speed, an effective mass is computed and collision determination is executed.

7 Claims, 6 Drawing Sheets

(56) References Cited

U.S. PATENT DOCUMENTS

| | | | |
|---|---|---|---|
| 2009/0015391 A1* | 1/2009 | Kiribayashi | B60R 21/0136 340/436 |
| 2009/0015392 A1* | 1/2009 | Takahashi | B60R 19/483 340/436 |
| 2015/0224956 A1* | 8/2015 | Takenaka | B60R 21/36 73/862.381 |
| 2015/0298636 A1 | 10/2015 | Furst | |
| 2016/0207495 A1* | 7/2016 | Le | B60R 21/01516 |
| 2016/0214555 A1* | 7/2016 | Le | B60R 19/483 |
| 2016/0375899 A1* | 12/2016 | Takenaka | B60T 7/22 701/41 |
| 2017/0197565 A1* | 7/2017 | Yoneyama | B60R 16/0231 |
| 2017/0355336 A1 | 12/2017 | Freienstein et al. | |
| 2018/0037180 A1* | 2/2018 | Narita | B60R 21/0133 |
| 2018/0194315 A1* | 7/2018 | Wakabayashi | B60R 19/205 |
| 2018/0208138 A1* | 7/2018 | Wakabayashi | G01L 5/00 |
| 2019/0023206 A1* | 1/2019 | Yoshida | B60R 19/48 |
| 2019/0051156 A1* | 2/2019 | Banvait | G08G 1/096791 |

FOREIGN PATENT DOCUMENTS

| | | |
|---|---|---|
| DE | 102015116276 A1 | 4/2016 |
| DE | 102016209309 A1 | 12/2016 |
| DE | 102016210470 A1 | 12/2017 |
| DE | 102016210491 A1 | 12/2017 |
| JP | 2006-264416 A | 10/2006 |
| JP | 2011-137743 A | 7/2011 |
| JP | 2016-068902 A | 5/2016 |
| JP | 2016-107719 A | 6/2016 |

OTHER PUBLICATIONS

Google patents English translation for German Patent Application Pub. No. DE 102012022392 B4 to Furst that was filed in 2012.*
All References Considered Except Where Lined Through.
Sep. 10, 2018 Office Action issed in German Patent Application No. 102017117473.7.

* cited by examiner

COLLISION DETECTION DEVICE FOR VEHICLE AND COLLISION DETECTION METHOD FOR VEHICLE

CROSS-REFERENCE TO RELATED APPLICATION

This application claims priority under 35 USC 119 from Japanese Patent application No. 2016-154869 filed on Aug. 5, 2016, the disclosure of which is incorporated by reference herein.

BACKGROUND

Technical Field

The present disclosure relates to a collision detection device for a vehicle and a collision detection method for the vehicle that detect a collision between the vehicle and an object.

Related Art

Heretofore, a collision detection device that detects a collision between a vehicle and an object has been known. Technologies have been proposed that, if this collision detection device determines that an object is a pedestrian, protect the pedestrian.

For example, a technology is known (for example, see Japanese Patent Application Laid-Open (JP-A) No. 2016-107719) that improves collision detection accuracy by identifying an object such as a moving two-wheel vehicle or the like with an on-board camera, detecting a relative speed between the vehicle and the object, and executing effective mass determination processing to calculate an effective mass of the object using a extended speed from a vehicle speed to the relative speed as a collision speed. In this technology, a collision between the vehicle and the object is detected if the calculated effective mass is above a threshold value for collision determination.

However, when a collision is determined from an effective mass that is calculated using a relative speed between the vehicle and a moving object such as a two-wheel vehicle or the like as the vehicle speed at the instant of collision, collision detection performance for a collision between a moving object such as a two-wheel vehicle or the like and the vehicle is unsatisfactory. For example, an object such as a two-wheel vehicle or the like may be running toward the vehicle. When the object such as a two-wheel vehicle or the like is running toward the vehicle, the relative speed between the vehicle and the object is higher than the vehicle speed. Consequently, calculating the effective mass from the relative speed may result in that the effective mass that is calculated does not reach a threshold value for collision determination. Thus, there is scope for improvement in accurately detecting collisions between vehicles and objects such as two-wheel vehicles and the like with a simple configuration.

SUMMARY

The present disclosure provides a collision detection device for a vehicle and a collision detection method for the vehicle that may improve collision detection performance in relation to objects such as two-wheel vehicles and the like.

A first aspect of the present disclosure is a collision detection device for a vehicle, including: a vehicle speed detection unit that detects a vehicle speed of the vehicle; a collision prediction unit that predicts a collision between the vehicle and an object, the object including a two-wheel vehicle being ridden by a two-wheel vehicle rider; an effective mass computation unit that, if a collision with a two-wheel vehicle is predicted by the collision prediction unit, computes an effective mass of the object on the basis of a speed that is lower than the vehicle speed detected by the vehicle speed detection unit, and if a collision with the object other than a two-wheel vehicle is predicted, computes the effective mass of the object on the basis of the vehicle speed detected by the vehicle speed detection unit; and a signal output unit that, if the effective mass of the object computed by the effective mass computation unit is at least a threshold value, outputs a signal that activates a protection device that protects people outside the vehicle including pedestrians and two-wheel vehicle riders.

According to the first aspect described above, the vehicle speed detection unit detects a vehicle speed of the vehicle, and the collision prediction unit predicts a collision between the vehicle and an object, which may be a two-wheel vehicle being ridden by a two-wheel vehicle rider. During a collision between the vehicle and a two-wheel vehicle being ridden by a two-wheel vehicle rider, protection of the two-wheel vehicle rider riding the two-wheel vehicle may be required. When collision detection for protection of a two-wheel vehicle rider is based on effective mass, calculating the effective mass using the vehicle speed as the speed at the instant of collision might result in that an effective mass that is lighter than the two-wheel vehicle rider is calculated and collision detection for protection of the two-wheel vehicle rider is not implemented. Accordingly, when a collision with a two-wheel vehicle is predicted by the collision prediction unit, the effective mass computation unit computes the effective mass on the basis of a lower speed than the vehicle speed detected by the vehicle speed detection unit, and when a collision with an object other than a two-wheel vehicle is predicted, the effective mass is computed on the basis of the vehicle speed detected by the vehicle speed detection unit. If the computed effective mass is at least the threshold value, the signal activating the protection device that protects people outside the vehicle, including pedestrians and two-wheel vehicle riders, is outputted by the signal output unit.

Thus, if a collision with a two-wheel vehicle is predicted, because the effective mass of the object is computed on the basis of a speed lower than the vehicle speed, a two-wheel vehicle rider may be protected during a collision between a two-wheel vehicle and the vehicle. Thus, collision detection performance may be improved.

A second aspect of the present disclosure is the collision detection device for a vehicle according to the first aspect, wherein the object includes a pedestrian.

According to the second aspect described above, because the object encompasses pedestrians, pedestrians and two-wheel vehicle riders may be protected.

A third aspect of the present disclosure is the collision detection device for a vehicle according to the first or the second aspect, further including a physical quantity detection unit that detects a physical quantity generated in the vehicle after the object impacts against the vehicle, wherein, if a collision with a two-wheel vehicle is predicted by the collision prediction unit, the effective mass computation unit computes the effective mass of the object on the basis of the physical quantity and the speed that is lower than the vehicle speed detected by the vehicle speed detection unit, and if a collision with the object other than a two-wheel vehicle is predicted, the effective mass computation unit computes the effective mass of the object on the basis of the vehicle speed detected by the vehicle speed detection unit and the physical quantity.

During a collision between the vehicle and an object, the effective mass of the object varies in accordance with the vehicle speed. The effective mass of the object also varies in accordance with physical quantities produced in the vehicle when the object impacts against the vehicle. Accordingly, in the third aspect described above, the physical quantity detection unit detects the physical quantity that is produced in the vehicle when the object impacts against the vehicle, and the effective mass is computed on the basis of the detected physical quantity and the speed at the instant of collision. Thus, because the effective mass is computed taking into account the physical quantity that is produced in the vehicle when the object impacts against the vehicle, collision detection performance in relation to the object may be improved.

A fourth aspect of the present disclosure is the collision detection device for a vehicle according to the first to the third aspect, further including a relative speed detection unit that detects a relative speed of the vehicle and a two-wheel vehicle, wherein, after a collision with the two-wheel vehicle is predicted by the collision prediction unit, if the relative speed detected by the relative speed detection unit is lower than the vehicle speed detected by the vehicle speed detection unit, the effective mass computation unit computes the effective mass of the object using the relative speed detected by the relative speed detection unit as the speed that is lower than the vehicle speed.

When there is a collision between the vehicle and an object while the object is moving, the effective mass of the object varies in accordance with the relative speed of the vehicle with respect to the object. Accordingly, in the fourth aspect described above, the relative speed of the vehicle and the object is detected by the relative speed detection unit. If the relative speed is lower than the vehicle speed, the effective mass is computed using the relative speed detected by the relative speed detection unit as the speed that is lower than the vehicle speed. Therefore, the effective mass may be computed in accordance with movement of an object that is a two-wheel vehicle, and collision detection performance in relation to the object may be improved.

A fifth aspect of the present disclosure is the collision detection device for a vehicle according to the first to the third aspect, wherein the speed that is lower than the vehicle speed is computed by multiplying the vehicle speed by a coefficient that is smaller than 1.

In the fifth aspect described above, the speed that is lower than the vehicle speed may be computed by multiplying the vehicle speed with the coefficient that is smaller than 1.

A sixth aspect of the present disclosure is the collision detection device for a vehicle according to the first to the fifth aspect, further including an impact location detection unit that detects an impact location of the vehicle that the object impacts, wherein the collision prediction unit predicts a predicted impact location of the vehicle at which an impact of a two-wheel vehicle is predicted, and the collision prediction unit predicts a collision with the two-wheel vehicle if the predicted impact location of the vehicle that is predicted corresponds with the impact location of the vehicle detected by the impact location detection unit.

When a collision with a two-wheel vehicle is predicted by the collision prediction unit, there may actually be an impact that is not the collision with the two-wheel vehicle. For example, there may be a collision with an object other than the two-wheel vehicle at a position or direction different from the position and direction of the two-wheel vehicle predicted by the collision prediction unit. Accordingly, in the sixth aspect described above, the collision with the two-wheel vehicle is predicted only if the predicted impact location in the vehicle that has been predicted corresponds with the impact location in the vehicle that is detected by the impact location detection unit. Thus, because a collision with a two-wheel vehicle is predicted only if the predicted impact location corresponds with the impact location, collision detection performance in relation to two-wheel vehicles may be improved.

A seventh aspect of the present disclosure is a collision detection method for a vehicle, including: detecting a vehicle speed of the vehicle; predicting a collision between the vehicle and an object, the object including a two-wheel vehicle being ridden by a two-wheel vehicle rider; if a collision with the two-wheel vehicle is predicted, computing an effective mass of the object on the basis of a speed that is lower than the detected vehicle speed, or if a collision with the object other than a two-wheel vehicle is predicted, computing the effective mass of the object on the basis of the detected vehicle speed; and if the computed effective mass of the object is at least a threshold value, outputting a signal that activates a protection device that protects people outside the vehicle including pedestrians and two-wheel vehicle riders.

According to the present disclosure as described above, collision detection performance in relation to objects such as two-wheel vehicles and the like may be improved.

BRIEF DESCRIPTION OF THE DRAWINGS

Exemplary embodiments of the present disclosure will be described in detail based in the following figures, wherein.

DETAILED DESCRIPTION

Herebelow, examples of exemplary embodiments of the present disclosure are described in detail with reference to the attached drawings.

First Exemplary Embodiment

Figure 1:
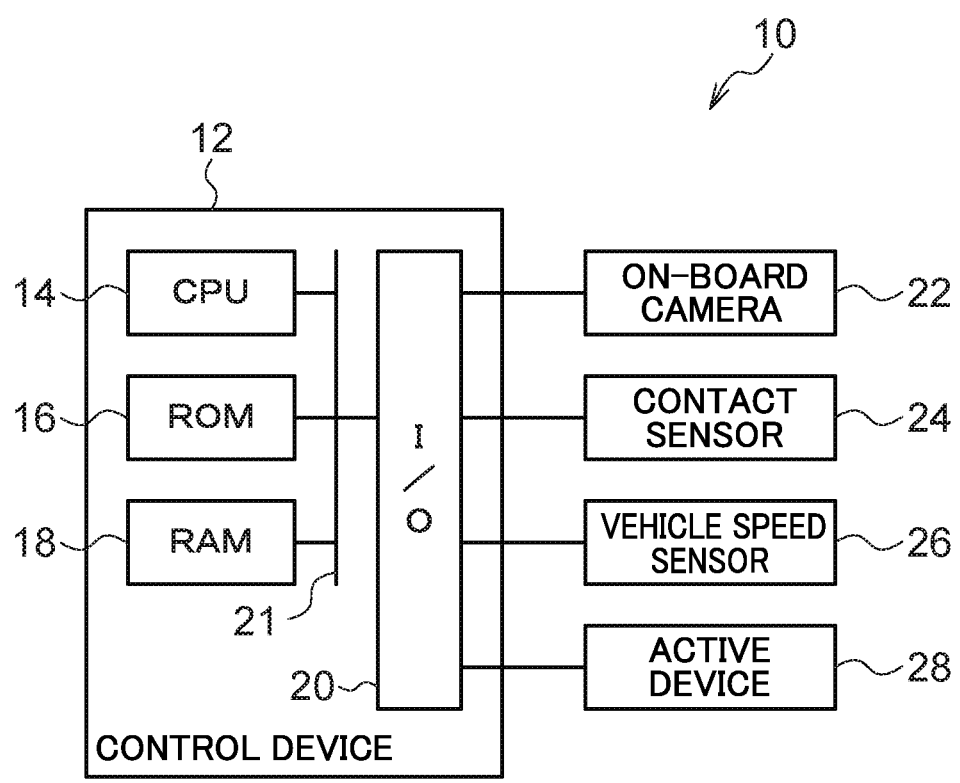
FIG. 1 is a block diagram showing an example of structures of a collision detection device for a vehicle according to a first exemplary embodiment.

FIG. 1 shows general structures of a collision detection device for a vehicle according to the present exemplary embodiment. A collision detection device for a vehicle 10 is equipped with a control device 12 that performs various kinds of control for detecting a collision between the vehicle and an object.

The control device 12 is structured by a microcomputer including a CPU 14, a ROM 16, a RAM 18 and an I/O (input/output interface) 20. The CPU 14, ROM 16, RAM 18 and I/O 20 are connected via a bus 21 to be respectively capable of sending and receiving commands and data.

A program for detecting a collision between the vehicle and an object, and data such as a threshold value for detecting a collision and the like, are memorized in the ROM 16. Control for detecting a collision between the vehicle and an object is implemented by the CPU 14 executing the program memorized in the ROM 16. The RAM 18 is used as cache memory and the like when the program is being executed.

An on-board camera 22, a contact sensor 24, a vehicle speed sensor 26 and an active device 28 are connected to the I/O 20. The on-board camera 22, the contact sensor 24 and the vehicle speed sensor 26 are detectors for detecting states of the vehicle. The on-board camera 22 is a non-contact detector that, by imaging in front of the vehicle, functions as a prevention sensor for detecting objects in front of the vehicle that have a possibility of colliding with the vehicle. A vehicle-mounted radar that scans in front of the vehicle can be mentioned as an alternative detector that functions as a prevention sensor. The contact sensor 24 is a detector that detects a physical quantity relating to a pressure produced by a collision with an object or suchlike at pre-specified locations of the vehicle bumper (described in detail below). A pressure chamber, pressure tube or the like is provided at the vehicle bumper. The contact sensor 24 detects a pressure in the pressure chamber or pressure tube. The vehicle speed sensor 26 is a detector that detects speeds of the vehicle (vehicle speeds).

The active device 28 is a device for operating a protection device. When there is a collision between the vehicle and an object, if the object is a pedestrian or a rider of a two-wheel vehicle, the protection device protects the pedestrian or the rider of the two-wheeled vehicle. In the present exemplary embodiment, a case is described in which a device for absorbing an impact against a pedestrian or a rider of a two-wheel vehicle at the vehicle front is employed as the active device 28. Specific examples of this device that can be mentioned include a gas generator that operates a pop-up hood to raise the hood and absorb an impact against a pedestrian or a rider of a two-wheel vehicle such as a bicycle or the like, an inflator that operates an airbag device that expands above the hood, and the like.

The control device 12 detects a collision between the vehicle and an object on the basis of output values from the on-board camera 22, the contact sensor 24 and the vehicle speed sensor 26. The control device 12 performs control to activate the active device 28 if the object is a pedestrian or a rider of a two-wheel vehicle.

In the present exemplary embodiment, the on-board camera 22 is an example of a detector that provides a relative speed and of a detector that predicts a collision. The contact sensor 24 is an example of a physical quantity detection unit. The vehicle speed sensor 26 is an example of a vehicle speed detection unit. The control device 12 is an example of a functional section that is an effective mass computation unit, of a functional section that is a collision prediction unit, and of a signal output unit.

Figure 2:
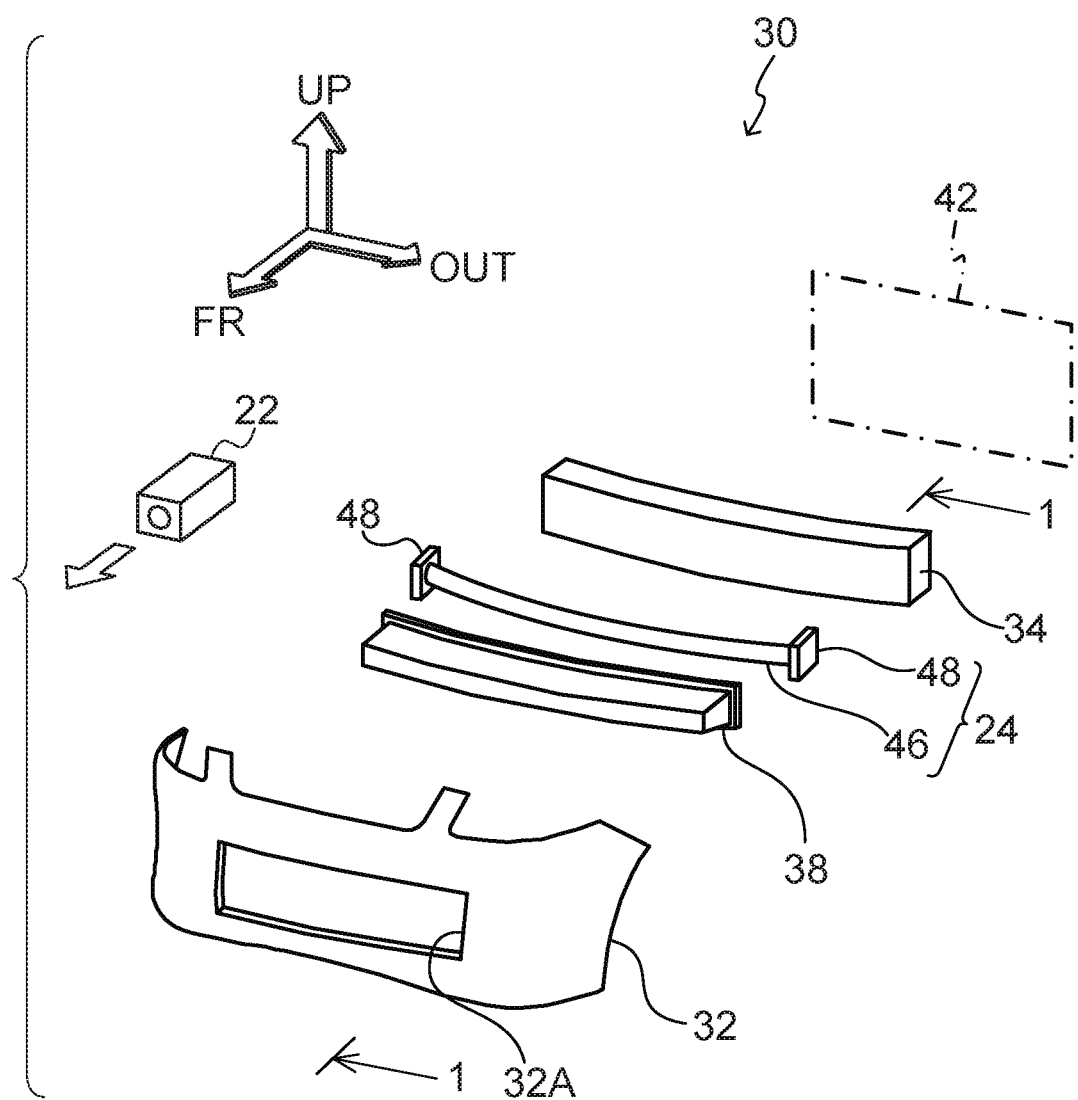
FIG. 2 is an exploded perspective view showing general structures in the vicinity of a vehicle bumper.

FIG. 2 shows an exploded perspective view of general structures in the vicinity of the vehicle bumper. In FIG. 2, the arrow UP, the arrow FR and the arrow OUT indicate the upward in the vehicle vertical direction, the front in the vehicle front-and-rear direction, and the outward (a left side) in the vehicle width direction.

A vehicle bumper 30 is provided at a front portion of the vehicle, which is, for example, an automobile or the like. The vehicle bumper 30 is provided with a front bumper cover 32, a bumper reinforcement 34 and an absorber 38. The contact sensor 24 (described in detail below) is disposed at the vehicle rear side of the absorber 38. The contact sensor 24 includes a pressure tube 46 and pressure sensors 48.

The front bumper cover 32 covers the bumper reinforcement 34 from the vehicle front side thereof. The front bumper cover 32 is mounted to the vehicle body, which is the bumper reinforcement 34 and so forth. An aperture portion 32A is formed in a lower portion of the front bumper cover 32. The aperture portion 32A is for guiding wind to a radiator 42 that is disposed at the vehicle rear side of the bumper reinforcement 34. The bumper reinforcement 34 is formed in a long, narrow shape along the vehicle width direction and provided at the vehicle. The absorber 38 is disposed with a length direction thereof along the vehicle width direction. The absorber 38 is disposed at the vehicle rear side of the front bumper cover 32.

The on-board camera 22 that functions as a prevention sensor is mounted above the vehicle bumper 30, for example, inside the vehicle at the position of a stay of a rear view mirror or the like.

Figure 3:
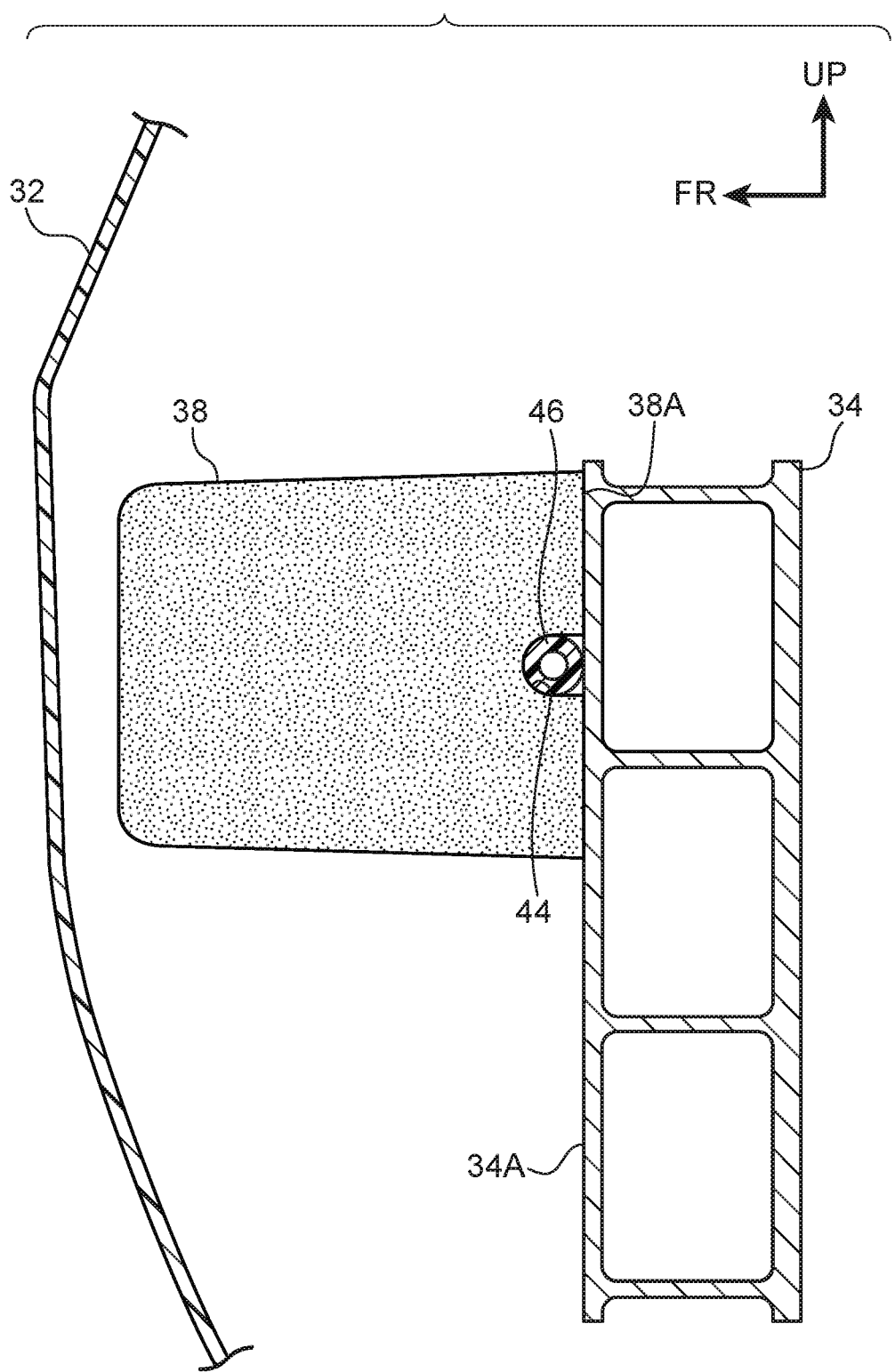
FIG. 3 is a partial magnified sectional view showing general structures in the vicinity of the vehicle bumper.

FIG. 3 shows a partial magnified section of general structures in the vicinity of the vehicle bumper. The bumper reinforcement 34 is formed in a hollow, substantially rectangular column shape that is constituted of a metal material such as an aluminium-based material or the like. The bumper reinforcement 34 is disposed at the vehicle rear of the front bumper cover 32 with a length direction of the bumper reinforcement 34 along the vehicle width direction.

The absorber 38 is constituted of a foam resin material, that is, a urethane foam or the like. The absorber 38 is provided between the front bumper cover 32 and the bumper reinforcement 34, and is formed in a long, narrow shape whose length direction is along the vehicle width direction. The absorber 38 is formed in a substantially rectangular shape in a sectional view seen in the length direction thereof. The absorber 38 is disposed adjacent to the vehicle front side of a predetermined region (for example, an upper portion) of the bumper reinforcement 34, and the absorber 38 is fixed to a front face 34A of the bumper reinforcement 34. A retaining groove portion 44 is formed in a rear face 38A of the absorber 38. The retaining groove portion 44 retains the pressure tube 46, which is described below. The retaining groove portion 44 is formed in a substantial "C" shape that opens to the vehicle rear side in a side sectional view (to be more specific, a circular shape that is partially open to the vehicle rear side thereof). The retaining groove portion 44 penetrates through the absorber 38 in the length direction thereof.

The pressure tube 46 is connected to the pressure sensors 48, which are provided at each of two vehicle width direction ends of the pressure tube 46 (see FIG. 2). The contact sensor 24 is constituted by the pressure tube 46 and the pressure sensors 48. That is, the contact sensor 24 includes the pressure tube 46 that is formed in a long, narrow shape and the pressure sensors 48 that output signals in response to pressure changes in the pressure tube 46. The pressure tube 46 is constituted as a hollow structure with a substantially annular shape in cross section. An outer diameter dimension of the pressure tube 46 is specified to be slightly smaller than an inner diameter dimension of the retaining groove portion 44 of the absorber 38, and a length direction length of the pressure tube 46 is specified to be longer than a length direction length of the absorber 38. The pressure tube 46 is arranged along the length direction of the absorber 38 by being assembled (fitted) into the retaining groove portion 44.

In the state in which the pressure tube 46 has been assembled into the retaining groove portion 44 of the absorber 38, in a sectional view seen in the length direction of the absorber 38, an outer periphery face of the pressure tube 46 is in contact with the rear face 38A of the absorber 38 or is disposed slightly apart from the rear face 38A to form a gap. Thus, the pressure tube 46 is disposed adjacent to the front face 34A of the bumper reinforcement 34. When a load toward the vehicle rear side acts on the absorber 38 and the absorber 38 presses the pressure tube 46, a reaction force is applied to the pressure tube 46 by the bumper reinforcement 34. The pressure sensors 48 provided at the two vehicle width direction ends of the pressure tube 46 are electronically connected to the control device 12. When the pressure tube 46 deforms, signals corresponding to pressure changes in the pressure tube 46 are outputted from the pressure sensors 48 to the control device 12.

Although FIG. 2 shows an example in which the pressure sensor 48 is disposed at both ends of the pressure tube 46, provision of the pressure sensor 48 at each of the two ends of the pressure tube 46 is not a limitation. For example, the pressure sensor 48 may be provided at one end portion of the pressure tube 46, the pressure sensor 48 may be provided at a middle portion of the pressure tube 46, or three or more of the pressure sensor 48 may be provided at a combination of end portions and middle portions. Furthermore, the contact sensor 24 structured by the pressure tube 46 and the pressure sensors 48 may be provided plurally in the vertical direction of the vehicle bumper 30.

Now, an effective mass M according to the present exemplary embodiment, for detecting a collision with an object, is described.

When there is a collision between the vehicle and an object, that is, the object impacts against the vehicle bumper 30, an effective mass M of the object may be calculated from a deformation amount of the vehicle bumper 30 and a speed V at the instant of collision between the vehicle and the object (below referred to as "the collision speed"). For example, the effective mass M may be obtained by integrating pressures detected by the contact sensor 24 over time to calculate an impulse, dividing the calculated impulse (N/s) by the collision speed V (km/h), and multiplying the result by a unit conversion value. If the object is a pedestrian, a walking speed of the pedestrian is low compared to the speed of the vehicle. Therefore, the collision speed V may be approximated by using the vehicle speed Va (km/h) detected by the vehicle speed sensor 26. To specify a threshold value for detecting a collision between the vehicle and an object, for example, effective masses M calculated from deformation amounts when pedestrians impact against the vehicle bumper 30 may be obtained in advance. Hence, when an effective mass M calculated from a deformation amount of the vehicle bumper 30 is at least the threshold value, it may be detected that there has been a collision with a pedestrian. Thus, when the effective mass M is at least the threshold value, the collision is detected, the active device 28 is activated, and the pedestrian may be protected.

Alternatively, at an instant of collision between, for example, the vehicle and a two-wheel vehicle being ridden by a two-wheel vehicle rider, even though a two-wheel vehicle running speed Vb is lower than the vehicle speed Va, the two-wheel vehicle running speed Vb is expected to be higher than a walking speed of a pedestrian. Moreover, a relative speed between the vehicle and the two-wheel vehicle differ depending on a running direction of the two-wheel vehicle relative to the vehicle (for example, running in the same direction or running in the opposite direction). Therefore, if the effective mass M is computed using the vehicle speed Va as an approximation of the collision speed V, it may be that the effective mass M does not reach the threshold value and the collision is not detected. That is, dealing with two-wheel vehicles in the same manner as pedestrians with walking speeds that are lower in comparison with the vehicle speed Va is unsatisfactory for accurately detecting a collision between an object that is a two-wheel vehicle and the vehicle in order to protect a two-wheel vehicle rider. Accordingly, if an object is assessed to be a two-wheel vehicle in the present exemplary embodiment, the collision speed is set to a speed for the two-wheel vehicle that is lower than the set vehicle speed Va, which speed for the two-wheel vehicle is set on the basis of the vehicle speed Va, and the effective mass M of the object is computed. Thus, the accuracy of collision detection between the vehicle and an object is improved.

For example, the collision speed V at an instant of collision between the vehicle and a two-wheel vehicle carrying a two-wheel vehicle rider is altered in accordance with the two-wheel vehicle running speed Vb. Consequently, the effective mass M at the instant of collision is altered in accordance with the two-wheel vehicle running speed Vb. As an example of a speed for the two-wheel vehicle that is lower than the vehicle speed Va, which is set on the basis of the vehicle speed Va when an object is assessed to be a two-wheel vehicle in the present exemplary embodiment, a relative speed Vr of the vehicle and the two-wheel vehicle is used as the collision speed. That is, when an object is assessed to be a two-wheel vehicle, in order to take account of the two-wheel vehicle running speed Vb, the relative speed Vr of the vehicle and the two-wheel vehicle (=Va−Vb) is used as the collision speed V.

When the relative speed Vr of the vehicle and a two-wheel vehicle is used as the collision speed V, if the vehicle and the two-wheel vehicle are running towards one another (in opposite directions), the relative speed Vr is higher, and if the vehicle and the two-wheel vehicle are running one away from the other (in the same direction with a speed difference), the relative speed Vr is lower. When there is a collision between the vehicle and a two-wheel vehicle in a state in which the two-wheel vehicle is running so as to approach the vehicle (in the opposite direction), using a relative speed Vr that is higher than the vehicle speed Va to compute the effective mass M might mean that the effective mass M does not reach the threshold value and the collision is not detected. Accordingly, when an object is assessed to be a two-wheel vehicle in the present exemplary embodiment, the relative speed Vr is used as the collision speed V to compute the effective mass M only if the relative speed Vr is less than or equal to the vehicle speed Va. On the other hand, if the relative speed Vr exceeds the vehicle speed Va, the vehicle speed Va is used as the collision speed V to compute the effective mass M.

Now, an example of processing that is executed by the control device 12 of the collision detection device for a vehicle 10 according to the present exemplary embodiment is described.

Figure 4:
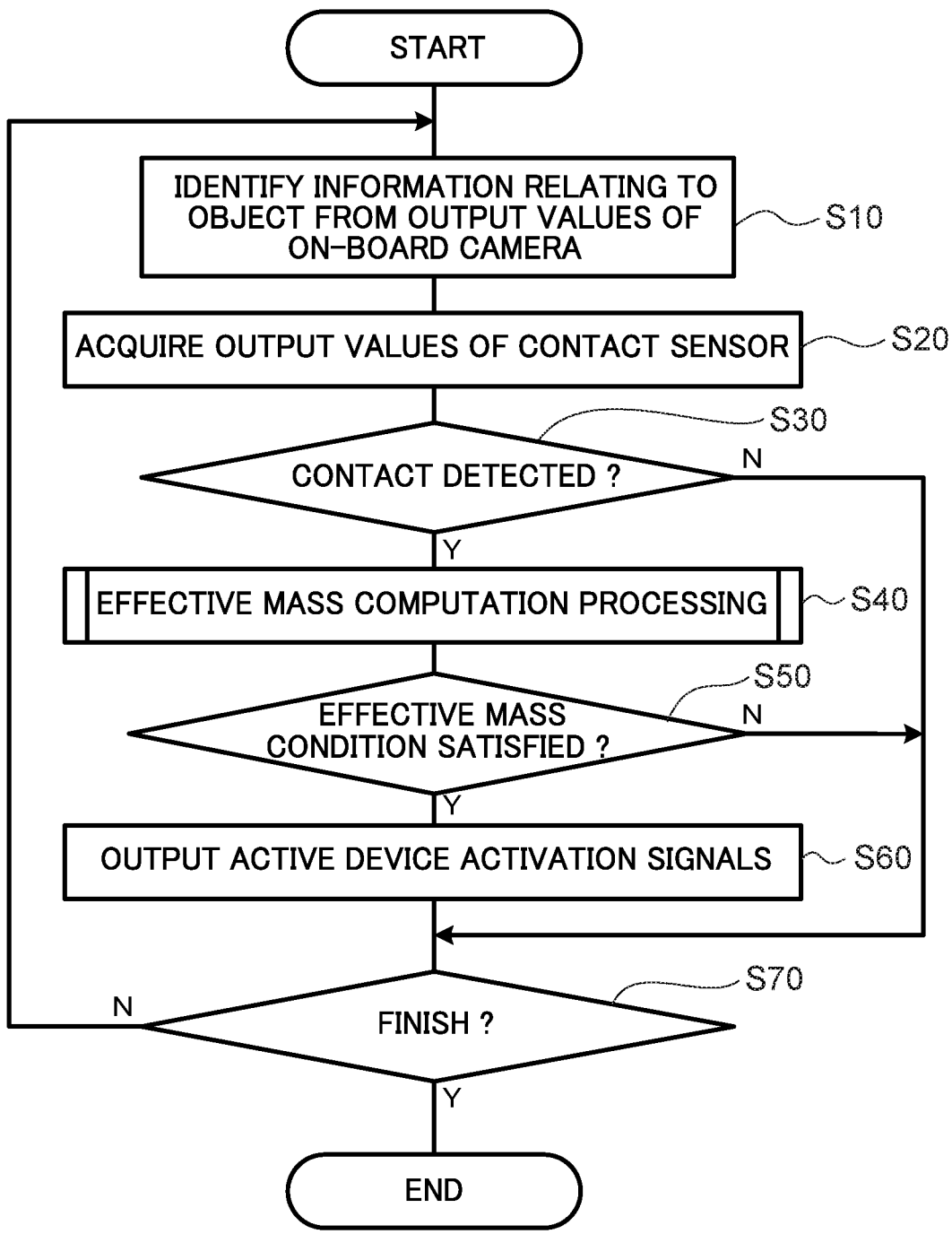
FIG. 4 is a flowchart showing an example of a flow of processing that is executed by a control device according to the first exemplary embodiment.

FIG. 4 shows an example of the flow of the processing executed by the control device 12 of the collision detection device for a vehicle 10 according to the present exemplary embodiment. In the present exemplary embodiment, a program encoding the example of the flow of processing shown in FIG. 4 is memorized in the ROM 16 in advance and executed by the control device 12. The processing in FIG. 4 is started when an ignition switch, which is not shown in the drawings, is turned on.

When the ignition switch is turned on, the control device 12 advances the processing to step S10, specifies information relating to an object from output values of the on-board camera 22 functioning as a prevention sensor, and temporarily memorizes the specified information relating to the object in the RAM 18.

As an example of the information relating to the object that is identified in step S10, a type of the object and a state of the object can be mentioned. Examples of the type of the object include pedestrians and two-wheel vehicles such as bicycles and the like. That is, the control device 12 identifies the type of an object in front of the vehicle from images captured by the on-board camera 22. In the present exemplary embodiment, the type of the object identifies whether or not the object is a two-wheel vehicle such as a bicycle or the like. Examples of the state of the object include a running state of the object. Examples of the running state of the object include a relative speed of the vehicle and the object. That is, from images captured by the on-board camera 22, the control device 12 computes the speed of an object in front of the vehicle (for example, a two-wheel vehicle running speed Vb) in accordance with the identified type of the object. The control device 12 then computes the relative speed of the vehicle and the object from the current vehicle speed Va, which is determined from output signals of the vehicle speed sensor 26, and the speed of the object in front of the vehicle. In this manner, the state of the object is identified.

Then, in step S20, the control device 12 acquires output values based on output signals from the contact sensor 24, and in step S30, the control device 12 uses the output values based on the output signals from the contact sensor 24 to make a determination as to whether contact between the vehicle and the object has been detected. That is, the result of the determination in step S30 is affirmative at a time at which the object comes into contact with the vehicle, regardless of the scale of the collision between the vehicle and the object. If the result of the determination in step S30 is affirmative, the control device 12 advances the processing to step S40. On the other hand, if at least some contact between the vehicle and the object is not detected, the result of the determination in step S30 is negative and the control device 12 advances the processing to step S70. In step S70, the control device 12 makes a determination as to whether the present processing is to finish, by making a determination as to whether the ignition switch has been turned off. If the result of this determination is affirmative, the present processing routine ends, and if the result of the determination is negative, the processing returns to step S10.

In step S40, effective mass computation processing is executed. The effective mass computation processing is processing that computes an effective mass when there is contact between the vehicle and an object. In step S40 of the present exemplary embodiment, the effective mass is computed using a collision speed V that takes account of a relative speed Vr.

Figure 5:
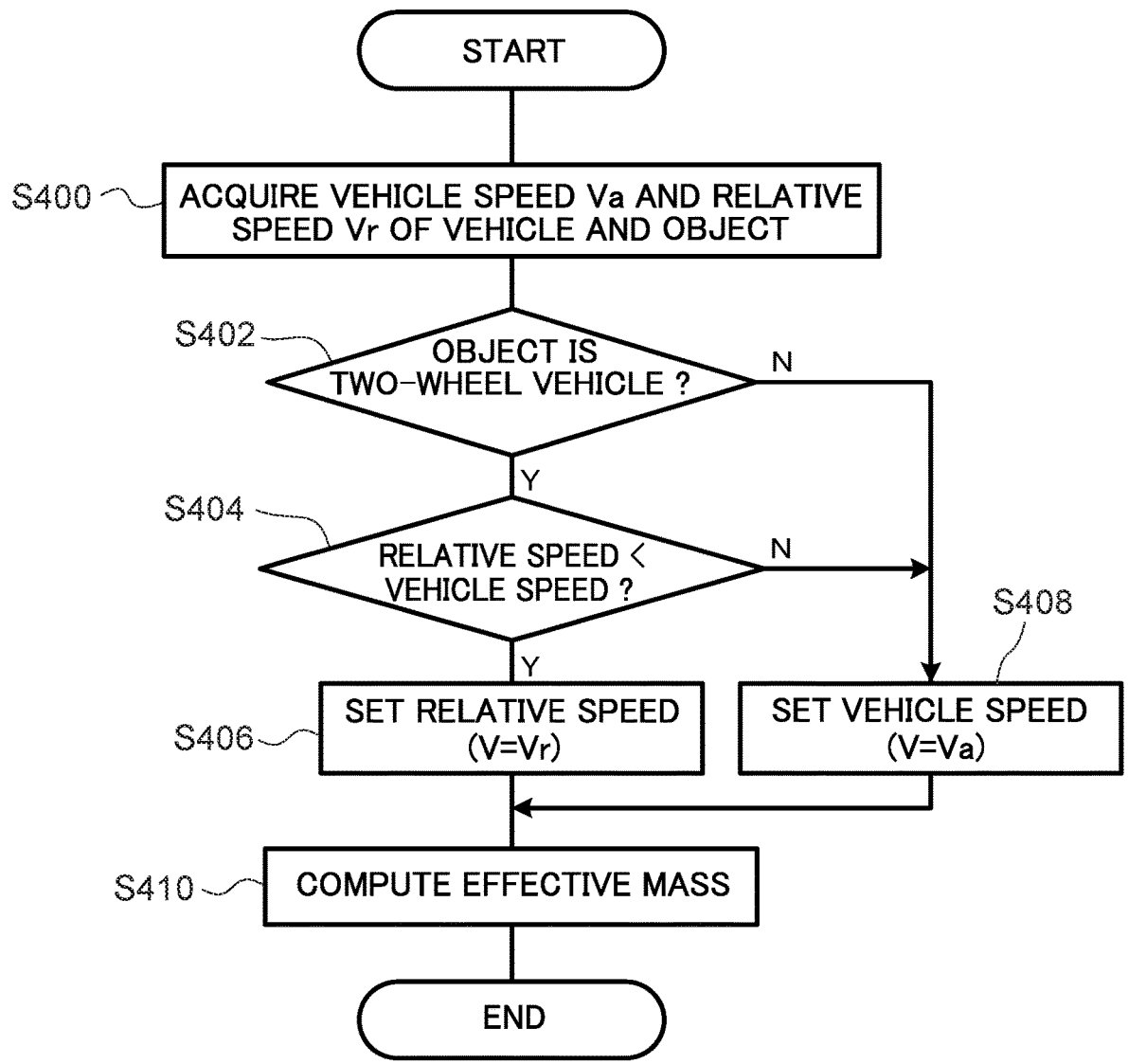
FIG. 5 is a flowchart showing an example of a flow of effective mass determination processing according to the first exemplary embodiment.

FIG. 5 shows an example of a flow of the effective mass determination processing that is executed in step S40 shown in FIG. 4.

Firstly, in step S400, the control device 12 acquires the relative speed Vr identified as the state of the object in step S10. Then, in step S402, the control device 12 makes a determination from the information relating to the object as to whether or not the type of the object is a two-wheel vehicle such as a bicycle or the like. Thus, the control device 12 makes a determination as to whether the object in front of the vehicle is assessed to be a two-wheel vehicle (for example, a bicycle). In other words, if the control device 12 assesses from the image information of the on-board camera 22 that the object in front of the vehicle is a two-wheel vehicle, the result of the determination in step S402 is affirmative, and the control device 12 advances the processing to step S406.

If the control device 12 does not assess that the object is a two-wheel vehicle and the result of the determination in step S402 is negative, the control device 12 advances the processing to step S408. In step S408, the control device 12 sets the vehicle speed Va as the collision speed V and advances the processing to step S410. For example, the control device 12 sets the vehicle speed Va as the collision speed V if the obstacle is a pedestrian and not a two-wheel vehicle.

On the other hand, if the control device 12 assesses that the object is a two-wheel vehicle, the control device 12 advances the processing to step S404 and executes a speed determination. That is, in step S404, the control device 12 makes a determination as to whether the relative speed Vr is less than the vehicle speed Va (Vr<Va). If the relative speed Vr is greater than or equal to the vehicle speed Va (Vr≥Va), the result of the determination in step S404 is negative and the control device 12 advances the processing to step S408. Alternatively, if the relative speed Vr is less than the vehicle speed Va (Vr<Va), the result of the determination in step S404 is affirmative and the control device 12 advances the processing to step S406. In step S406, the control device 12 sets the relative speed Vr that is lower than the vehicle speed Va as the collision speed V, and advances the processing to step S410.

Then, in step S410, the control device 12 uses the collision speed V set in step S406 or step S408 to compute the effective mass M, and the control device 12 ends the present processing routine. That is, in step S410, the control device 12 computes the effective mass M using the collision speed V based on the vehicle speed Va set in step S406 or the relative speed Vr set in step S408.

As shown in FIG. 4, when the effective mass computation processing shown in step S40 (FIG. 5) is completed, the processing advances to step S50. In step S50, the control device 12 makes a determination as to whether the computed effective mass M conforms to (for example, matches) an effective mass condition. In the present exemplary embodiment, an example of the effective mass condition is a condition that the effective mass M computed in step S40 (i.e., step S410 shown in FIG. 5) is an effective mass M that is equal to or greater than a pre-specified threshold value, which is a target for activation of the active device 28. Accordingly, in step S50, the control device 12 makes a determination as to whether to activate the active device 28 by making a determination as to whether the effective mass M is at least the threshold value. If the effective mass M is less than the threshold value, the result of the determination in step S50 is negative and the control device 12 advances the processing to step S70.

The determination processing in step S50 may be considered as collision determination processing that determines whether or not the contact between the vehicle and the object is a collision that should be subject to activation of the active device 28.

On the other hand, if the effective mass M is at least the threshold value, the result of the determination in step S50 is affirmative, the control device 12 advances the processing to step S60, and a command for activation of the active device 28 is given. That is, in step S60, the control device 12 outputs activation signals representing an activation command to the active device 28. As a result, the active device 28 is activated to protect a pedestrian. Alternatively, if the object is a two-wheel vehicle, the active device 28 is activated in order to protect a rider of the two-wheel vehicle. After the output of the activation signals in step S60, the processing advances to step S70.

If continued execution of the present processing routine is not required after an output of the activation signals to the active device 28, the present processing routine shown in FIG. 4 is ended after the processing of step S60.

In the present exemplary embodiment, the processing is described as being implemented by a program representing the flow of processing shown in FIG. 4 being executed. However, the processing of the program may be realized in hardware.

As described above in the present exemplary embodiment, when an object in front of the vehicle is predicted to be a two-wheel vehicle according to the on-board camera 22, if a relative speed Vr of the vehicle and the object (two-wheel vehicle) is less than or equal to a vehicle speed Va, the effective mass M is computed using the relative speed Vr as a collision speed V. Therefore, even if the object is a two-wheel vehicle running toward the vehicle, computation of an effective mass M that is less than a threshold value for collision determination may be suppressed. Thus, collision detection accuracy may be improved compared to a configuration in which a collision is detected on the basis of an effective mass M that simply uses the relative speed Vr of the vehicle and the object (two-wheel vehicle).

In the present exemplary embodiment, when an object for which a collision with the vehicle is predicted is a two-wheel vehicle and the relative speed Vr is less than the vehicle speed Va, the effective mass M is computed using the relative speed Vr as the collision speed V. Therefore, collision detection accuracy may be improved with a simpler configuration than a configuration in which the threshold value is set lower for a two-wheel vehicle.

In the present exemplary embodiment, a collision may be detected with an effective mass M computed from a collision speed that is set for a two-wheel vehicle using a relative speed Vr between the vehicle and the object. Thus, a collision detection device for pedestrians may also be used as a device that detects collisions with riders of two-wheel vehicles.

In the present exemplary embodiment, a case is described in which the speed of an object in front of the vehicle (the running speed Vb of a two-wheel vehicle) is found from images captured by the on-board camera 22, and then the relative speed Vr of the vehicle and the object is computed. However, identifying the speed of an object (the running speed Vb of a two-wheel vehicle) from captured images is not a limitation. For example, the running speed of an object may be detected by a detector and the relative speed Vr may be computed using the detected running speed Vb. The relative speed Vr may be detected directly by an on-board laser or Doppler sensor that scans in front of the vehicle.

Second Exemplary Embodiment

Now, a second exemplary embodiment is described. The second exemplary embodiment has a similar structure to the first exemplary embodiment. Therefore, structures that are the same are assigned the same reference numerals and are not described here. In the first exemplary embodiment, if an object is assessed to be a two-wheel vehicle, the collision speed for computing the effective mass M of the object is set to a speed for the two-wheel vehicle, which is lower than the vehicle speed Va, taking account of the relative speed Vr. In the second exemplary embodiment, when an object is assessed to be a two-wheel vehicle, the vehicle speed Va is multiplied by a coefficient for two-wheel vehicles to set a speed for the two-wheel vehicle, which is lower than the vehicle speed Va, as the collision speed.

Firstly, at the control device 12 of the collision detection device for a vehicle 10 according to the present exemplary embodiment, processing is executed in accordance with the flow of processing illustrated in FIG. 4, similarly to the first exemplary embodiment. Because the processing that is executed is the same as the processing executed by the control device 12 that is illustrated in FIG. 4, detailed descriptions are not given here.

In the present exemplary embodiment, however, in step S10, the control device 12 includes information representing a positional relationship of the vehicle and the object in the information relating to the object that is identified from output signals of the on-board camera 22 functioning as a prevention sensor.

That is, an example of information relating to the object that is identified in step S10 shown in FIG. 4 according to the present exemplary embodiment includes the type of the object and the state of the object. Examples of the type of the object include at least two-wheel vehicles such as bicycles and the like. Examples of the state of the object include a positional relationship of the vehicle and the object as a running state of the object. The positional relationship of the vehicle and the object includes a position or direction of the object in front of the vehicle relative to the vehicle. That is, the control device 12 computes a position or direction of the object in front of the vehicle in accordance with the identified type of the object from the images captured by the on-board camera 22. In this manner, the state of the object is identified.

In the present exemplary embodiment, the on-board camera 22 is an example of a detector for obtaining a predicted impact location, and the contact sensor 24 is an example of an impact location detection unit.

Figure 6:
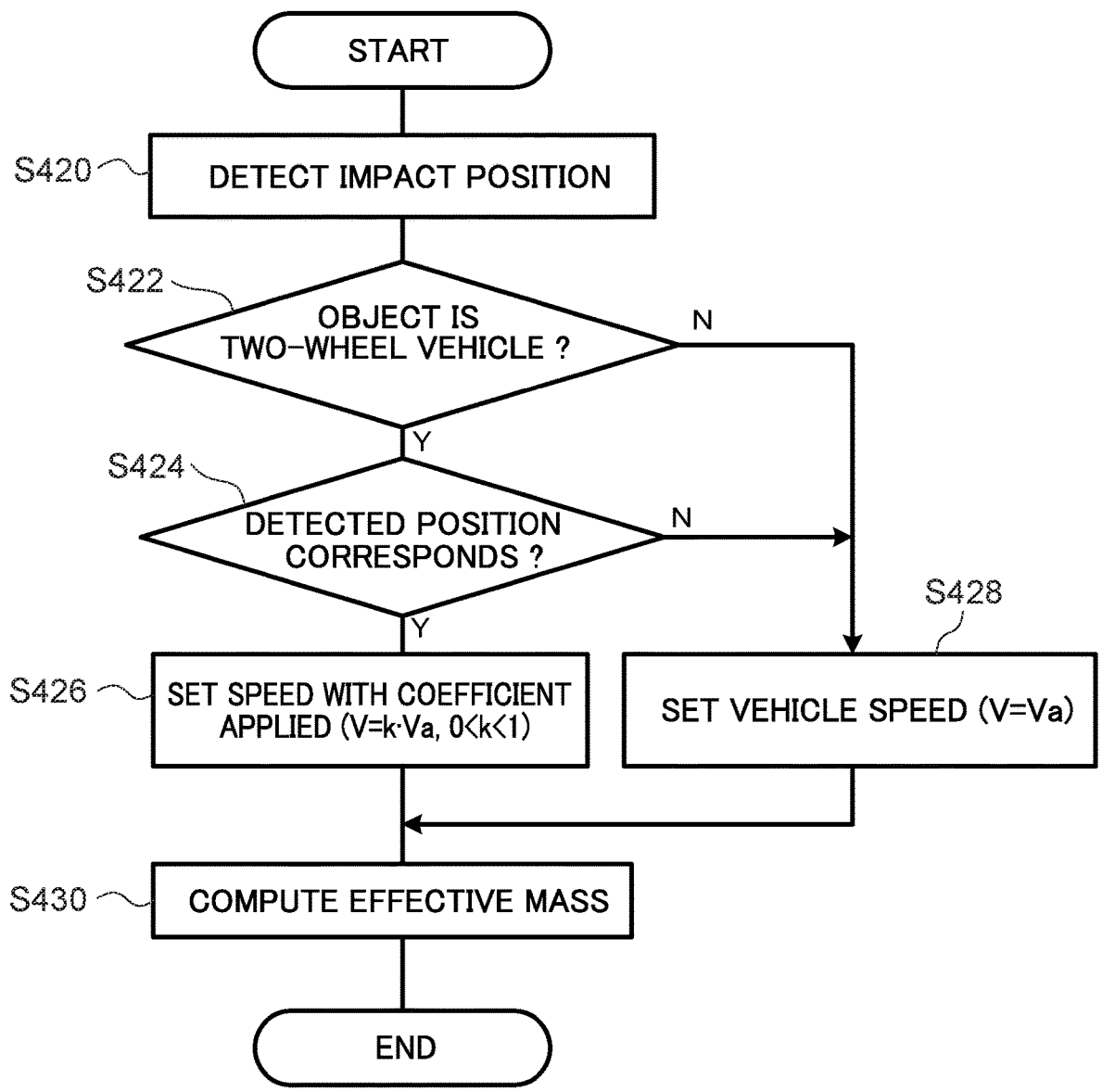
FIG. 6 is a flowchart showing an example of a flow of effective mass determination processing that is executed by a control device according to a second exemplary embodiment.

FIG. 6 shows an example of the flow of the collision determination processing executed by the control device 12 of the collision detection device for a vehicle 10 according to the present exemplary embodiment.

Firstly, in step S420, the control device 12 detects an impact position of the vehicle and the object. In step S420, the control device 12 detects both an impact position at which the object actually impacts against the vehicle (an actual impact position) and an impact position at which the object has been predicted to impact against the vehicle (a predicted impact position). Each impact position includes at least a position in the vehicle width direction.

For the impact position at which the object actually impacts against the vehicle, for example, an impact position of the vehicle and the object may be detected using output signals from the contact sensor 24. The contact sensor 24 includes the pressure tube 46 that is connected to the pressure sensors 48 provided at each of the two vehicle width direction ends. Each of the pressure sensors 48 outputs signals in accordance with pressure changes (a physical quantity relating to pressure) that are produced when an object impacts against the vehicle bumper. Because the pressure sensors 48 are provided at the two vehicle width direction ends, a time difference (a phase difference)

between the signals representing respective pressure changes at the pressure sensors 48 provided at the two vehicle width direction ends occurs in accordance with the position in the vehicle width direction at which the object impacts. Therefore, the control device 12 may calculate a time difference (phase difference) from the respective output signals of the pressure sensors 48 included in the contact sensor 24 that are provided at the two vehicle width direction ends and, from the time difference (phase difference), the control device 12 may detect the impact position in the vehicle width direction of the object impacting against the vehicle. The impact position at which the object actually impacts against the vehicle may also be found at the time at which the object comes into contact with the vehicle, regardless of the scale of the collision between the vehicle and the object.

The impact position against which the object is predicted to impact against the vehicle may be predicted from, for example, images captured by the on-board camera 22. For example, correspondences between positions in images captured by the on-board camera 22 and positions in the vehicle width direction of the vehicle may be established in advance, and these correspondences may be used to predict the impact position at which the object impacts against the vehicle from positions of the object in the captured images. In this case, the position may be precisely predicted by acquiring a time series of images and calculating a movement direction of the object relative to the vehicle from changing positions of the object in the time series. A direction of the object relative to the vehicle may also be found from positions in images captured by the on-board camera 22. In this case, the impact position at which the object impacts against the vehicle may be predicted by directions of the object relative to the vehicle being associated with positions in the vehicle width direction of the vehicle. Captured images may be acquired in a time series and, when the impact is predicted, the position may be predicted precisely from a changing direction of the object in the time series.

Then, in step S422, similarly to step S402 shown in FIG. 5, the control device 12 makes a determination as to whether the object in front of the vehicle is assessed to be a two-wheel vehicle (for example, a bicycle), by making a determination from the information relating to the object as to whether or not the type of the object is a two-wheel vehicle such as a bicycle or the like. If the result of the determination in step S422 is affirmative, the control device 12 advances the processing to step S424, and if the result of the determination is negative, the control device 12 advances the processing to step S428. In step S428, the control device 12 sets the vehicle speed Va as the collision speed V. Thus, the control device 12 specifies that the collision speed V is the vehicle speed Va if, for example, the obstacle is a pedestrian and not a two-wheel vehicle.

In step S424, the control device 12 makes a determination of correspondence (for example, a determination of matching or not) between the actual impact position and predicted impact position detected in step S420. If the actual impact position corresponds with the predicted impact position, the result of the determination in step S424 is affirmative and, in step S426, the control device 12 multiplies the vehicle speed Va by a two-wheel vehicle coefficient k (0<k<1) to calculate a speed for the two-wheel vehicle (=k·Va) and sets the speed for the two-wheel vehicle as the collision speed V. Alternatively, if the actual impact position does not correspond with the predicted impact position, the result of the determination in step S424 is negative and, in step S428, the control device 12 sets the vehicle speed Va as the collision speed V.

The two-wheel vehicle coefficient k (0<k<1) that is employed may be a pre-specified value such that a speed lower than the vehicle speed Va is produced, and the two-wheel vehicle coefficient k may be set in accordance with a running direction of the two-wheel vehicle. For example, the value of the coefficient k may be set to be smaller when there is a greater angle between the running direction of the vehicle and the running direction of the two-wheel vehicle. Values of the coefficient k may be established in advance according to, for example, angles between the running direction of the vehicle and running directions of two-wheel vehicles. The coefficient k may also be set in accordance with the size, weight or the like of a two-wheel vehicle rider if the size, weight or the like of the two-wheel vehicle rider can be predicted. For example, the value of the coefficient k may be set to be larger when the size, weight or the like of the two-wheel vehicle rider is larger. These values established for the coefficient k are examples and may be found in advance by experiment or the like.

Thus, when an object is assessed to be a two-wheel vehicle, if an actual impact position and a predicted impact position correspond (for example, match), the collision speed V is set to a speed for the two-wheel vehicle for which the vehicle speed Va is multiplied by the coefficient k. As a result, when an object is assessed to be a two-wheel vehicle, collision prediction accuracy with the two-wheel vehicle may be improved. Because the collision speed V is set to the vehicle speed Va if an object other than the two-wheel vehicle impacts after it has been predicted that the object is a two-wheel vehicle, cases of collision determination for an object other than a two-wheel vehicle on the basis of an effective mass M for a two-wheel vehicle may be suppressed. Therefore, inappropriate activation of the active device 28 for the object other than a two-wheel vehicle may be suppressed.

In the present exemplary embodiment, a case is described in which the collision speed V is set to the speed for the two-wheel vehicle for which the vehicle speed Va is multiplied by the coefficient k when the actual impact position corresponds with (for example, matches) the predicted impact position (step S424). However, this setting is not limited to situations in which the actual impact position corresponds with (for example, matches) the predicted impact position. For example, if protecting two-wheel vehicle riders is prioritized, the determination processing of step S424 is not necessary and may be omitted. That is, when the control device 12 predicts that an object is a two-wheel vehicle (an affirmative result in step S422), the control device 12 may advance the processing directly to step S426.

Then, at step S430 the control device 12 uses the collision speed V set in step S426 or step S428 to execute determination processing based on the effective mass M. That is, similarly to step S410 shown in FIG. 4, the control device 12 computes the effective mass M using the collision speed V set in step S426 or step S428 (the vehicle speed Va or the speed for the two-wheel vehicle that is the vehicle speed Va multiplied by the coefficient k). Then the control device 12 ends the present processing routine.

In the present exemplary embodiment as described above, when an object is assessed to be a two-wheel vehicle, if an actual impact position and a predicted impact position correspond (for example, match), a speed for the two-wheel vehicle that is the vehicle speed Va multiplied by the coefficient k is set as the collision speed V. Therefore, when an object is assessed to be a two-wheel vehicle, collision detection accuracy with the two-wheel vehicle may be improved.

In the present exemplary embodiment, because the speed for the two-wheel vehicle (=k·Va) that is lower than the vehicle speed Va is set as the collision speed V, the effective mass M of a two-wheel vehicle may be computed to correspond to a change of setting of the threshold value for two-wheel vehicles, without a new threshold value for two-wheel vehicles being set. Therefore, collisions with pedestrians and the like and collisions with two-wheel vehicles on which riders are riding may be accurately determined with a simple configuration.

In the present exemplary embodiment, a case is described in which an impact position is detected by the contact sensor 24 provided at the vehicle bumper 30. However, a plural number of the contact sensor 24 may be provided in the vehicle width direction to detect impact positions. As a further example for detecting impact positions, a plural number of touch sensors in the vehicle width direction may be provided at the vehicle bumper 30 to detect impact positions.

In the present exemplary embodiment, a case is described in which, when an actual impact position and a predicted impact position correspond (for example, match), the effective mass M is calculated using a speed for the two-wheel vehicle for which a vehicle speed Va is multiplied by a two-wheel vehicle coefficient k as the collision speed V. This condition of the actual impact position and the predicted impact position corresponding (for example, matching) may also be applied to the first exemplary embodiment. That is, the effective mass M may be computed on the basis of the relative speed Vr when an actual impact position and a predicted impact position correspond (for example, match).

In the above exemplary embodiments, cases are described in which a pressure tube and pressure sensor are provided at the vehicle bumper 30 and an effective mass calculated from a deformation amount of the vehicle bumper 30 is detected. However, for example, a pressure chamber and pressure sensor may be provided at the vehicle bumper 30 and a pressure thereof detected as a deformation amount of the vehicle bumper 30.

In the above exemplary embodiments, cases are described in which a pressure sensor is provided at the vehicle bumper 30 and a deformation amount of the vehicle bumper 30 is detected. However, for example, an acceleration sensor may be used to detect a deformation amount of the vehicle bumper 30.

In the above exemplary embodiments, cases that include two-wheel vehicles as objects are described, but the objects are not limited to two-wheel vehicles. The present disclosure is also applicable to single-wheel vehicles and three-wheel vehicles, and to vehicles equipped with more wheels. Moreover, a bicycle has been mentioned as an example of a two-wheel vehicle but is not limited to bicycles. The present disclosure is also applicable to light vehicles.

The program executed by the control device 12 in the embodiments described above may be stored as a program in a storage medium and distributed.

What is claimed is:

1. A collision detection device for a vehicle, comprising:
   a vehicle speed detection unit that detects a vehicle speed of the vehicle;
   a collision prediction unit that predicts a collision between the vehicle and an object, the object including a two-wheel vehicle being ridden by a two-wheel vehicle rider;
   an effective mass computation unit that,
       if a collision with a two-wheel vehicle is predicted by the collision prediction unit, computes an effective mass of the object on the basis of a speed that is lower than the vehicle speed detected by the vehicle speed detection unit, and
       if a collision with the object other than a two-wheel vehicle is predicted, computes the effective mass of the object on the basis of the vehicle speed detected by the vehicle speed detection unit; and
   a signal output unit that, if the effective mass of the object computed by the effective mass computation unit is at least a threshold value, outputs a signal that activates a protection device that protects people outside the vehicle including pedestrians and two-wheel vehicle riders.

2. The collision detection device for a vehicle according to claim 1, wherein the object includes a pedestrian.

3. The collision detection device for a vehicle according to claim 1, further comprising a physical quantity detection unit that detects a physical quantity generated in the vehicle after the object impacts against the vehicle, wherein:
   if a collision with a two-wheel vehicle is predicted by the collision prediction unit, the effective mass computation unit computes the effective mass of the object on the basis of the physical quantity and the speed that is lower than the vehicle speed detected by the vehicle speed detection unit, and
   if a collision with the object other than a two-wheel vehicle is predicted, the effective mass computation unit computes the effective mass of the object on the basis of the vehicle speed detected by the vehicle speed detection unit and the physical quantity.

4. The collision detection device for a vehicle according to claim 1,
   further comprising a relative speed detection unit that detects a relative speed of the vehicle and a two-wheel vehicle,
   wherein, after a collision with the two-wheel vehicle is predicted by the collision prediction unit, if the relative speed detected by the relative speed detection unit is lower than the vehicle speed detected by the vehicle speed detection unit, the effective mass computation unit computes the effective mass of the object using the relative speed detected by the relative speed detection unit as the speed that is lower than the vehicle speed.

5. The collision detection device for a vehicle according to claim 1, wherein the speed that is lower than the vehicle speed is computed by multiplying the vehicle speed by a coefficient that is smaller than 1.

6. The collision detection device for a vehicle according to claim 1,
   further comprising an impact location detection unit that detects an impact location of the vehicle that the object impacts, wherein
   the collision prediction unit predicts a predicted impact location of the vehicle at which an impact of a two-wheel vehicle is predicted, and
   the collision prediction unit predicts a collision with the two-wheel vehicle if the predicted impact location of the vehicle that is predicted corresponds with the impact location of the vehicle detected by the impact location detection unit.

7. A collision detection method for a vehicle, comprising:
   detecting a vehicle speed of the vehicle;

predicting a collision between the vehicle and an object, the object including a two-wheel vehicle being ridden by a two-wheel vehicle rider;

if a collision with the two-wheel vehicle is predicted, computing an effective mass of the object on the basis of a speed that is lower than the detected vehicle speed, or if a collision with the object other than a two-wheel vehicle is predicted, computing the effective mass of the object on the basis of the detected vehicle speed; and if the computed effective mass of the object is at least a threshold value, outputting a signal that activates a protection device that protects people outside the vehicle including pedestrians and two-wheel vehicle riders.

* * * * *